United States Patent
Rudd et al.

(10) Patent No.: US 6,954,794 B2
(45) Date of Patent: Oct. 11, 2005

(54) METHODS AND SYSTEMS FOR EXCHANGING REACHABILITY INFORMATION AND FOR SWITCHING TRAFFIC BETWEEN REDUNDANT INTERFACES IN A NETWORK CLUSTER

(75) Inventors: Joseph Michael Rudd, Cary, NC (US); Benjamin Crawford Robinson, Raleigh, NC (US); Jeffrey Lynn Ellis, Holly Springs, NC (US); David F. Knierim, Cary, NC (US)

(73) Assignee: Tekelec, Calabasas, CA (US)

( * ) Notice: Subject to any disclaimer, the term of this patent is extended or adjusted under 35 U.S.C. 154(b) by 0 days.

(21) Appl. No.: 10/274,744

(22) Filed: Oct. 21, 2002

(65) Prior Publication Data

US 2004/0078481 A1 Apr. 22, 2004

(51) Int. Cl.[7] .......................... G06F 15/16; H04L 12/18
(52) U.S. Cl. ...................... 709/230; 709/238; 370/351; 370/432
(58) Field of Search ................................ 709/200–206, 709/220–227, 238–242, 247, 230, 235, 249, 250, 214, 295; 370/351, 352, 432, 231

(56) References Cited

U.S. PATENT DOCUMENTS

| | | | | |
|---|---|---|---|---|
| 6,041,049 A | * | 3/2000 | Brady | 370/351 |
| 6,088,333 A | * | 7/2000 | Yang et al. | 370/238 |
| 6,167,444 A | * | 12/2000 | Boden et al. | 709/223 |
| 6,385,649 B1 | * | 5/2002 | Draves et al. | 709/224 |
| 6,392,997 B1 | * | 5/2002 | Chen | 370/252 |
| 6,567,380 B1 | * | 5/2003 | Chen | 370/238 |
| 6,701,377 B2 | * | 3/2004 | Burmann et al. | 709/249 |
| 6,707,820 B1 | * | 3/2004 | Arndt et al. | 370/395.2 |
| 6,778,498 B2 | * | 8/2004 | McDysan | 370/231 |
| 2002/0138628 A1 | * | 9/2002 | Tingley et al. | 709/227 |

OTHER PUBLICATIONS

Steven, W. Richard, TCP/IP Illustrated, vol. 1, 1994, Addison–Wesley, pp. 143–144.*

* cited by examiner

Primary Examiner—Krisna Lim
(74) Attorney, Agent, or Firm—Jenkins, Wilson & Taylor, P.A.

(57) ABSTRACT

Methods and systems for exchanging reachability information and for switching between redundant interfaces in a network cluster are disclosed. Nodes in the network cluster are connected via redundant links and exchange reachability messages at periodic intervals. Each node includes a kernel routing table used to route messages and a reachability application routing table for storing reachability information used to update entries in the kernel routing table. Each node executes a predetermined algorithm for selecting entries in the reachability application routing table to be written to the kernel routing table.

36 Claims, 6 Drawing Sheets

METHODS AND SYSTEMS FOR EXCHANGING REACHABILITY INFORMATION AND FOR SWITCHING TRAFFIC BETWEEN REDUNDANT INTERFACES IN A NETWORK CLUSTER

TECHNICAL FIELD

The present invention relates to methods and systems for exchanging reachability information in a network cluster. More particularly, the present invention relates to methods and systems for exchanging reachability information and for switching between redundant interfaces in a network cluster.

RELATED ART

In Internet protocol (IP) networks, routers exchange reachability information using routing protocols. One of the most widely used routing protocols in autonomous systems in today's IP networks is the routing information protocol (RIP). According to RIP, routers exchange reachability messages with neighboring routers by broadcasting routing information messages. The routing information messages include IP network addresses and hop counts indicating the distance to each network address from the advertising router. Each router runs a distance vector algorithm to build its kernel or network routing table based on the shortest path to each destination.

While RIP has been an effective routing protocol for large IP networks, it is unsuitable and overly complex for network clusters. As used herein, the term "network cluster" refers to a set of network nodes connected via the same local area network (LAN) or LANs. In network clusters, because the nodes are directly connected, it is unnecessary to run distance vector algorithms or to exchange hop count information. However, in such networks, it is desirable to exchange reachability information for reliability purposes. For example, if one path between two nodes in a cluster fails, the routing protocol preferably detects the failure and switches to another available route.

RIP is also unsuitable for fast switchover in network clusters because of its slow timeout period for unavailable routes. For example, in RIP, a router in active mode broadcasts a message every thirty seconds. The message includes IP network addresses and integer distances to each network. Other routers receive these messages and store the reachability information in their kernel routing tables. However, a route does not become invalid unless 180 seconds pass without the route being advertised again. Such a slow timeout period is unsuitable for switching between redundant interfaces in a network cluster when one of the interfaces fails. For example, data rates in the network cluster may be on the order of megabits or gigabits per second. A switchover period that is on the order of seconds will thus result in significant loss of data.

Accordingly, in light of the problems associated with applying conventional routing protocols to network clusters, there exists a long felt need for improved methods and systems for exchanging reachability information and for switching traffic between redundant interfaces in a network cluster.

DESCRIPTION OF THE INVENTION

The present invention includes improved methods and systems for exchanging reachability information and for switching traffic between redundant interfaces in a network cluster. According to one aspect of the invention, first and second nodes in a cluster are connected via LAN connections between LAN interfaces of the first and second nodes. Each LAN interface of the first and second nodes periodically broadcasts a reachability message associating a physical IP address of each LAN interface with a virtual IP address associated with each node. The first node receives the reachability messages from the second node and stores virtual-to-physical IP address mappings for each of the LAN interfaces associated with the second node in a reachability application routing table. The reachability application routing table is used only to update entries in a kernel routing table, which is used to route packets.

In order to add entries to the kernel routing table, the first node extracts one of the virtual-to-physical IP address mappings for the second node from the reachability application routing table and stores the selected mapping in the kernel routing table. For example, the first node may store the first-received or the most recently received route in the kernel routing table. The second node performs similar steps to maintain reachability application and kernel routing tables for the interfaces of the first node.

At each node, the entries in the reachability application routing table are scanned periodically. In one example, the scanning period is 200 milliseconds. A pass count is associated with each entry in the reachability application routing table. The pass count is altered each time a node scans a particular entry. When a reachability message is received for a particular route, the pass count is reset for the corresponding entry in the reachability application routing table. If the pass count reaches a predetermined value, the entry is deleted from the reachability application routing table. If the route is being used in the node's kernel routing table, it is also deleted from that routing table. If a backup route exists, the backup route is stored in the kernel routing table.

Thus, the present invention exchanges reachability information between directly connected nodes and greatly reduces the time required for switching to new routes when a route fails when compared to the time required by conventional routing protocols, such as RIP.

Accordingly, it is an object of the invention to provide improved methods and systems for exchanging reachability information between directly connected nodes.

It is another object of the invention to provide improved methods and systems for quickly switching to a new route in a cluster when one route fails.

BRIEF DESCRIPTION OF THE DRAWINGS

Preferred embodiments of the invention will now be explained with reference to the accompanying drawings of which.

DETAILED DESCRIPTION OF THE INVENTION

Figure 1A:
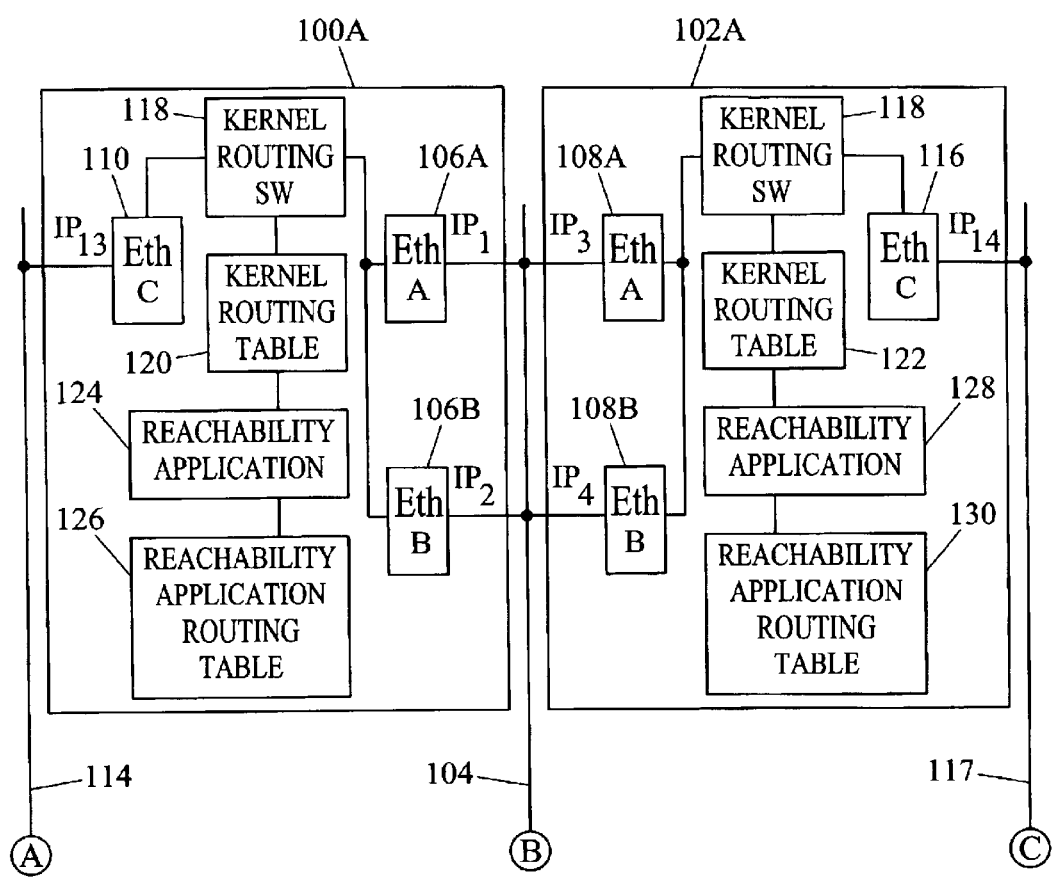
FIGS. 1A and 1B are a block diagram of a network cluster including a system for exchanging reachability information between cluster nodes and for switching between cluster nodes according to an embodiment of the present invention.
Figure 1B:
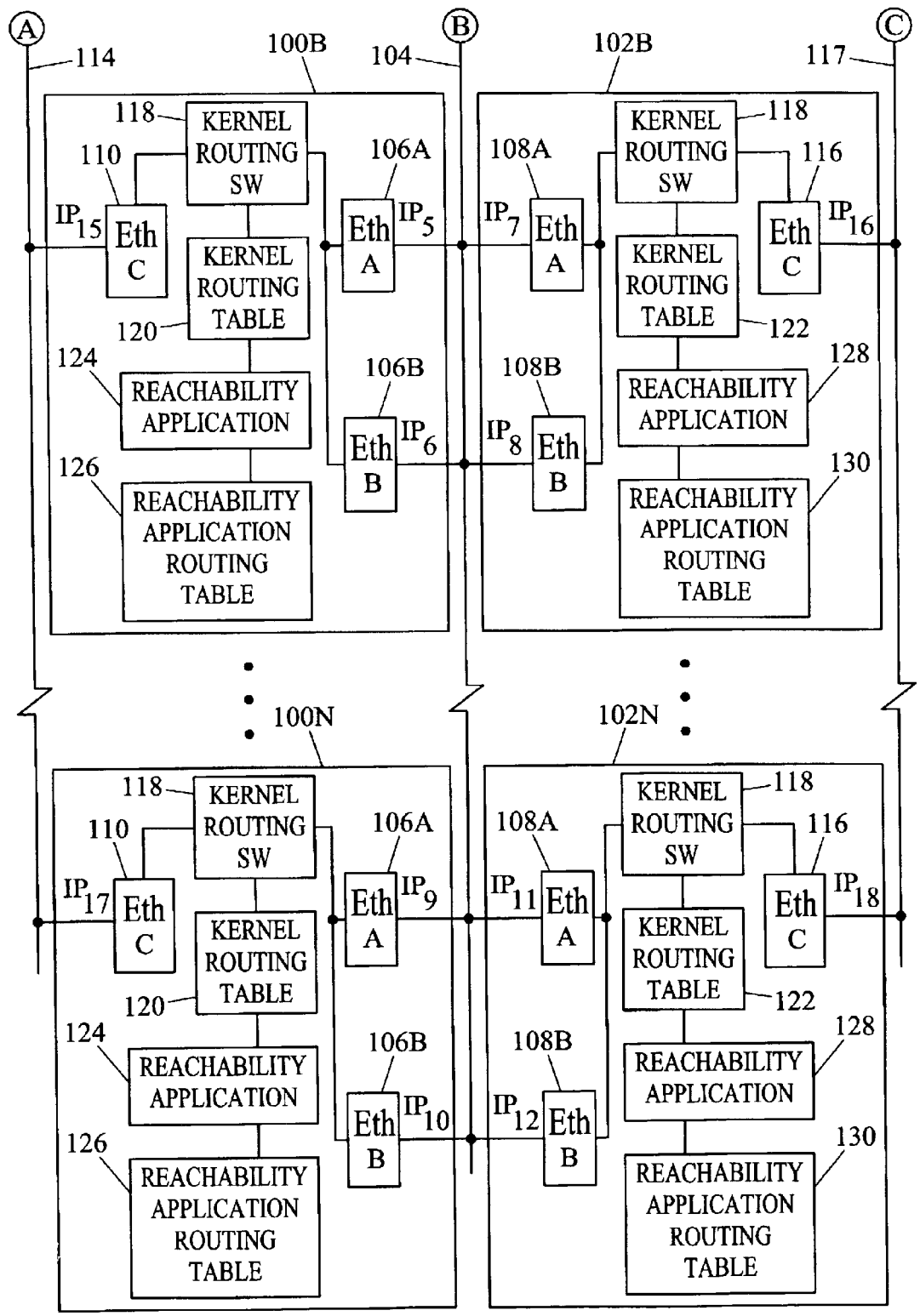

The present invention includes improved methods and systems for exchanging reachability information and for switching between redundant interfaces in a network cluster. FIGS. 1A and 1B illustrate a network cluster including a system for exchanging reachability information and performing fast switchover according to an embodiment of the present invention. Referring to FIGS. 1A and 1B, a plurality of first cluster nodes 100A–100N are connected to a plurality of second cluster nodes 102A–102N via a local area network 104. First cluster nodes 100A–100N may be any type of nodes capable of sending and receiving messages to other nodes in a network cluster. In one example, cluster nodes 100A–100N may be communications modules in a signaling message routing node, such as a signal transfer point or an SS7/IP gateway. Such modules receive and process signaling messages received over SS7 and IP signaling links. One function of such modules is to copy signaling messages received on external signaling links and send message copies to external network monitoring processors. Accordingly, second cluster nodes 102A–102N may be network monitoring processors coupled to the signal transfer point or SS7/IP gateway. However, the present invention is not limited to exchanging reachability information between communications modules in a signaling message routing node and network monitoring processors. The reachability exchange and switchover protocols described herein may be applied to any type of directly connected nodes.

In order to provide redundant connectivity, each first cluster node 100A–100N includes first and second network interfaces 106A and 106B. In the illustrated example, interfaces 106A and 106B may each be an Ethernet interface. Similarly, each cluster node 102A–102N includes first and second network interfaces 108A and 108B. Network interfaces 108A and 108B of each second cluster node 102A–102N may also be Ethernet interfaces. Ethernet interfaces 106A and 106B of each cluster node 100A–100N are connected to Ethernet interfaces 108A and 108B of each second cluster node 102A–102N through LAN 104. It is understood that the Ethernet interfaces on each redundantly connected pair of cluster nodes may have different IP network addresses to conform with IP routing protocols.

Applications on cluster nodes 100A–100N may use LAN 104 to communicate with applications on cluster nodes 102A–102N. For example, if cluster nodes 100A–100N include signaling message copying functions, the signaling message copying functions may send copies of signaling messages to network monitoring applications resident on cluster nodes 102A–102N via LAN 104.

Although the example illustrated in FIGS. 1A and 1B shows cluster nodes 100A–100N being connected to cluster nodes 102A–102N via a single LAN 104, the present invention is not limited to such an embodiment. In an alternate embodiment, cluster nodes 100A–100N and cluster nodes 102A–102N may be connected by more than one LAN for redundancy purposes.

In addition to Ethernet interfaces 106A and 106B, each cluster node 100A–100N may also include an additional Ethernet interface 110 for communicating with other processing modules via LAN 114. For example, if cluster nodes 100A–100N are located in a signaling message routing node, Ethernet interfaces 110 may be used for interprocessor communication within the signaling message routing node. Similarly, each cluster node 102A–102N may also include Ethernet interfaces 116 for communicating with each other and with other nodes via LAN 117.

In the illustrated example, each cluster node 100A–100N is redundantly connected to each cluster node 102A–102N. Thus, if any single network interface fails, a method needs to be provided in order to switch to the available interface without disrupting communications between applications. Some applications, such as network monitoring applications, may use TCP/IP connections or SCTP/IP connections that are set up in advance to exchange data. In a TCP/IP connection, each endpoint of the connection must bind a local IP address with the connection. This IP address is usually associated with a physical interface. Thus, if a physical interface fails, it is necessary to set up a new TCP/IP connection using another IP address and another physical interface. Because TCP/IP connections require a message exchange between endpoints to be established, requiring a new TCP/IP connection to be established in the event of an interface failure could result in significant loss of data.

In order to avoid this difficulty, cluster nodes 100A–100N and 102A–102N use virtual IP addresses for TCP connections. By "virtual IP address," it is meant that the IP address is not associated with a physical interface. In one example, cluster nodes 100A–100N use a single virtual IP address to route messages over network interfaces 106A and 106B. Each cluster node 102A–102N may use a separate virtual IP address used to route messages over network interfaces 108A and 108B. The present invention is not limited to using one virtual IP address for cluster nodes 100A–100N and separate virtual IP addresses for each of cluster nodes 102A–102N. In an alternate embodiment of the invention, cluster nodes 100A–100N may each use a separate virtual IP address and/or cluster nodes 102A–102N may use the same virtual IP address. Table 1 shown below illustrates possible combinations of virtual IP (VIP) addresses between nodes 100A–100N and 102A–102N.

TABLE 1

| Virtual IP Address Combinations | |
| --- | --- |
| 100A–100N | 102A–102N |
| one VIP for all nodes | one VIP per node |
| one VIP for all nodes | one VIP for all nodes |
| one VIP per node | one VIP for all nodes |
| one VIP per node | one VIP per node |

Using a virtual IP address to decouple TCP connections from physical interfaces allows switching between physical interfaces without requiring the setting up of a new TCP connection. Even though virtual IP addresses remove the association between TCP connections and physical interfaces, it is still necessary to determine particular physical interface to which message should be sent. Accordingly, each cluster node 100A–100N includes kernel routing software 118 and kernel routing table 120 for mapping virtual IP addresses of cluster nodes 102A–102N to physical IP addresses of interfaces 108A and 108B associated with cluster nodes 102A–102N. Similarly, each cluster node 102A–102N includes kernel routing software 118 and a kernel routing table 122 for mapping virtual IP addresses of cluster nodes 100A–100N to physical IP addresses of interfaces 106A and 106B of each cluster node 100A–100N.

Table 2 shown below illustrates an example of a kernel routing table that may be used at each cluster node 100A–100N. In Table 2, it is assumed that cluster nodes 102A, 102B, and 102N each have virtual IP addresses $VIP_1$, $VIP_2$, and $VIP_3$, respectively.

TABLE 2

Kernel Routing Table for Cluster Nodes 100A–100N

| VIP | PHYS. IP |
|---|---|
| $VIP_1$ | $IP_3$ |
| $VIP_2$ | $IP_7$ |
| $VIP_3$ | $IP_{11}$ |

According to Table 2, the virtual IP address $VIP_1$ is associated with the physical IP address $IP_3$. The physical IP address $IP_3$ corresponds to Ethernet interface 108A in cluster node 102A. Cluster nodes 102B and 102N also have physical IP addresses associated with their respective virtual IP addresses in the kernel routing table 120 of cluster node 100A. Accordingly, when an application on cluster node 100A sends a message to an application on cluster node 102A, the application will insert the virtual IP address $VIP_1$ in the destination address field of the IP header of the packet. Kernel routing software 118 on cluster node 100A interrogates the kernel IP routing table and determines how the IP packet is to be routed. Based on the IP destination $VIP_1$, kernel routing software 118 determines that the physical IP address $IP_3$ should be used as the next hop IP address. Kernel routing software 118 obtains the associated MAC address associated with $IP_3$ and uses it to encapsulate the outbound packet in an Ethernet frame. The Ethernet frame is sent to Ethernet interface 106A, which transmits the frame on LAN 104. Ethernet interface 108A receives the frame and passes the frame up the stack until the data reaches the intended application.

Kernel routing software 118 and kernel routing table 122 on cluster node 102A may perform similar functions when routing messages to cluster node 100A. Table 3 shown below illustrates an example of kernel routing table 122. In Table 3, it is assumed that cluster nodes 100A–100N utilize a single virtual IP address $VIP_4$.

TABLE 3

Kernel Routing Table for Cluster Nodes 102A–102N

| VIP | PHYS. IP |
|---|---|
| $VIP_4$ | $IP_1$ |

Table 3 illustrates a routing table including a virtual-to-physical IP address mapping that may be stored by one of cluster nodes 102A–102N. Since cluster nodes 100A–100N share a single virtual IP address, it is desirable to ensure that messages from cluster nodes 102A–102N are evenly distributed between cluster nodes 100A–100N. The routing table illustrated in Table 3 includes a single entry that maps the virtual IP address shared by cluster nodes 100A–100N to the physical IP address $IP_1$ associated with Ethernet interface 106A on cluster node 100A. The kernel routing tables on the remaining cluster nodes 102B–102N may include different virtual-to-physical IP address mappings in order to ensure even distribution of messages to cluster nodes 100A–100N. An exemplary method for ensuring that kernel routing tables 122 evenly distribute messages among cluster nodes 100A–100N will be described in detail below.

In order to maintain reliable communications between cluster nodes 100A–100N and cluster nodes 102A–102N, the information in kernel routing tables 120 and 122 must be maintained current and must be rapidly updated in the event that a particular network interface fails. For example, if Ethernet interface 108A on cluster node 102A fails, the entry in Table 2 for virtual IP address $VIP_1$ is preferably changed to associate $VIP_1$ with IP address $IP_4$. Conventional routing protocols, such as RIP, may be used to exchange such reachability information. However, as stated above, RIP is overly complex and not fast enough for communications in network clusters.

Accordingly, in order to exchange reachability information and update kernel routing tables 120 and 122 quickly, each cluster node 100A–100N includes a reachability application 124 and a reachability application routing table 126. Similarly, each cluster node 102A–102N includes a reachability application 128 and a reachability application routing table 130. Reachability applications 124 broadcast reachability messages to cluster nodes 102A–102N advertising virtual-to-physical IP address mappings associated with cluster nodes 100A–100N. Similarly, reachability applications 128 broadcast reachability messages to cluster nodes 100A–100N to advertise virtual-to-physical IP address mappings associated with cluster nodes 102A–102N. Reachability applications 124 store reachability information received from cluster nodes 102A–102N in reachability application routing tables 126. Similarly, reachability applications 128 store virtual-to-physical IP address mappings received from cluster nodes 100A–100N in reachability application routing tables 130.

Reachability application routing tables 126 and 130 are each used to update their respective kernel routing tables 120 and 122. Reachability applications 126 and 130 are preferably not used for routing messages. Detailed procedures for using information in reachability application routing tables 126 and 130 to update kernel routing tables 120 and 122 will now be described.

Figure 2:
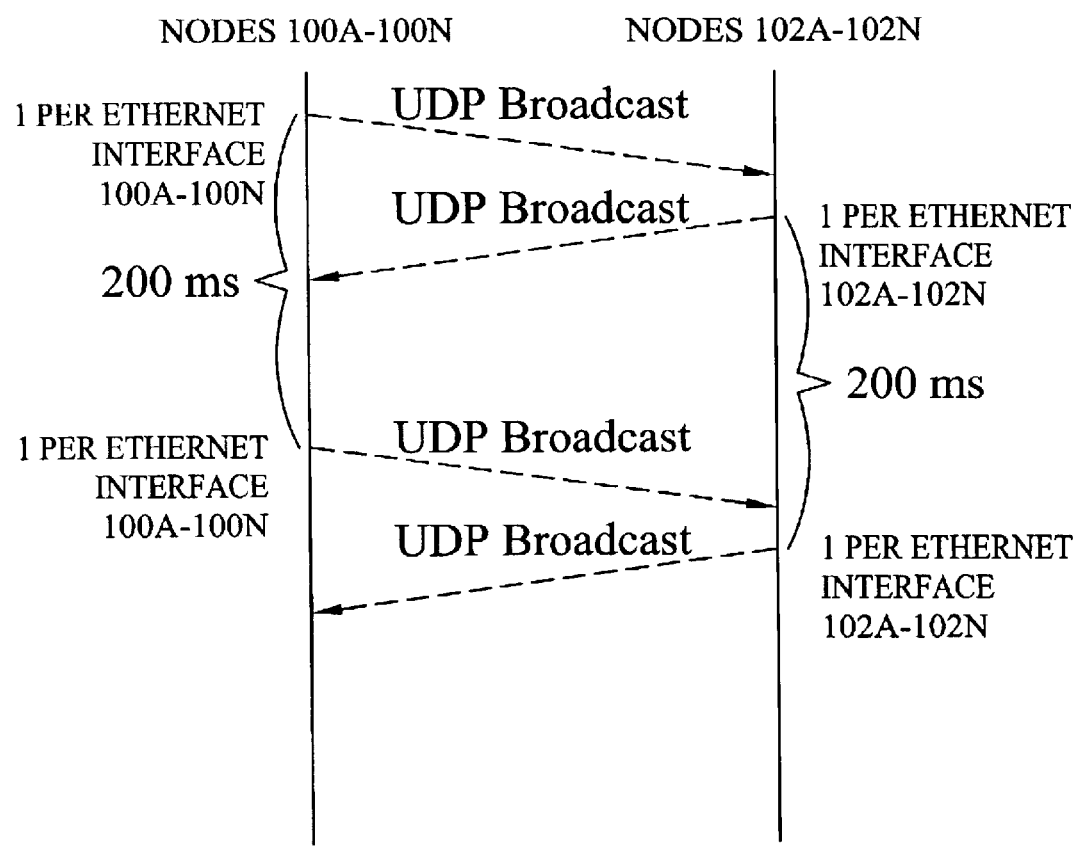
FIG. 2 is a message flow diagram illustrating the exchange of reachability messages between cluster nodes according to an embodiment of the present invention.

FIG. 2 is a message flow diagram illustrating an exemplary exchange of reachability information between nodes 100A–100N and 102A–102N. In the illustrated example, each interface on nodes 100A–100N sends a reachability message advertising its virtual-to-physical IP address mapping. Similarly, each interface on nodes 102A–102N sends a reachability message to nodes 100A–100N advertising its virtual-to-physical IP address mapping. Two messages are sent for each node 100A–100N and 102A–102N because in FIG. 1, each node has two network interfaces. However, the present invention is not limited to sending reachability information between nodes with only two network interfaces. Sending reachability information between any number of network interfaces between directly connected nodes is intended to be within the scope of the invention. If the nodes include more than two Ethernet interfaces, a reachability message will be sent for each Ethernet interface on the LAN interconnecting the nodes.

The reachability messages may be sent via UDP broadcasts. Accordingly, reachability applications 128 on nodes 102A–102N may listen on a predetermined UDP port for reachability messages from nodes 100A–100N. Similarly, reachability applications 124 on nodes 100A–100N may listen on a different UDP port for reachability messages broadcast from nodes 102A–102N. The time interval for reachability messages is preferably short enough so that routing information and routing tables is updated quickly. In the illustrated example, the time interval between reachability messages is set to 200 milliseconds. However, the present invention is not limited to using a 200 millisecond broadcast interval. Any suitable interval that allows routing table entries to be updated rapidly is intended to be within the scope of the invention.

The following is an example of source code for a data structure used by reachability applications 124 and 128 for building reachability messages.

```
1    struct s_trp_udp_message
2    {
3    t_u8           version;
4    e_trp_message_type type;
5    t_u8           num_ip_addrs;
6    t_u8           pad; /* used to stay on 4 byte boundary */
7    t_ip_addr      submask;
8    union
9    {
10   t_ip_addr pvn;
11   t_ip_addr vip;
12   }addr[1];
13
14   };
15
16   typedef struct s_trp_udp_message t_trp_udp_message;
```

In the source code listed above, "pvn" represents "private virtual network" and "vip" represents "virtual IP address." In this example, the pvn variable is used to store the virtual IP address of cluster nodes 100A–100N. The pvn variable is used to store the individual virtual IP addresses of nodes 102A–102N.

The struct command defines a data structure for the reachability message. Line 3 of the source code defines the version of the message in order to allow for updates and compatibility. Line 4 of the source code identifies the message type, which in this case will be a reachability advertisement message. Line 5 of the source code indicates the number of IP addresses associated with the particular reachability message so that if multiple IP addresses are being advertised in a single message, the receiver will know how to parse the reachability message. Line 6 of the data structure is used for padding. Line 7 of the data structure identifies the subnet mask associated with the IP address. Lines 10 and 11 of the data structure are used to store the virtual IP addresses of nodes 100A–100N and 102A–102N.

The reachability information illustrated in the source code above is exchanged between nodes 100A–100N and 102A–102N and used to update reachability application routing tables. Reachability applications 124 and 128 extract the virtual IP address from the reachability messages and extract the corresponding physical IP address from the source address field of the IP header of the messages in order to build reachability application routing tables 126 and 130. Table 4 shown below illustrates an example of a reachability application routing table 126 that may be maintained by cluster nodes 100A–100N.

TABLE 4

Reachability Application Routing Table

| VIP | PHYS IP | Pass Count |
|---|---|---|
| $VIP_1$ | $IP_3$ | 2 |
| $VIP_1$ | $IP_4$ | 2 |
| $VIP_2$ | $IP_7$ | 1 |

TABLE 4-continued

Reachability Application Routing Table

| VIP | PHYS IP | Pass Count |
|---|---|---|
| $VIP_2$ | $IP_8$ | 0 |
| $VIP_3$ | $IP_{11}$ | 1 |
| $VIP_3$ | $IP_{12}$ | 2 |

In Table 4, it is assumed that cluster nodes 102A–102N include virtual IP addresses $VIP_1$, $VIP_2$, and $VIP_3$, respectively. As can be seen from Table 4, each virtual IP address is associated with multiple physical IP addresses. Exemplary methods for selecting the proper mapping to update the kernel routing tables will be described in detail below. In Table 4, each entry also includes a pass count. The pass count is used to age out entries in the event of a network interface failure. The use of the pass count to age out entries will be described in detail below.

Figure 3:
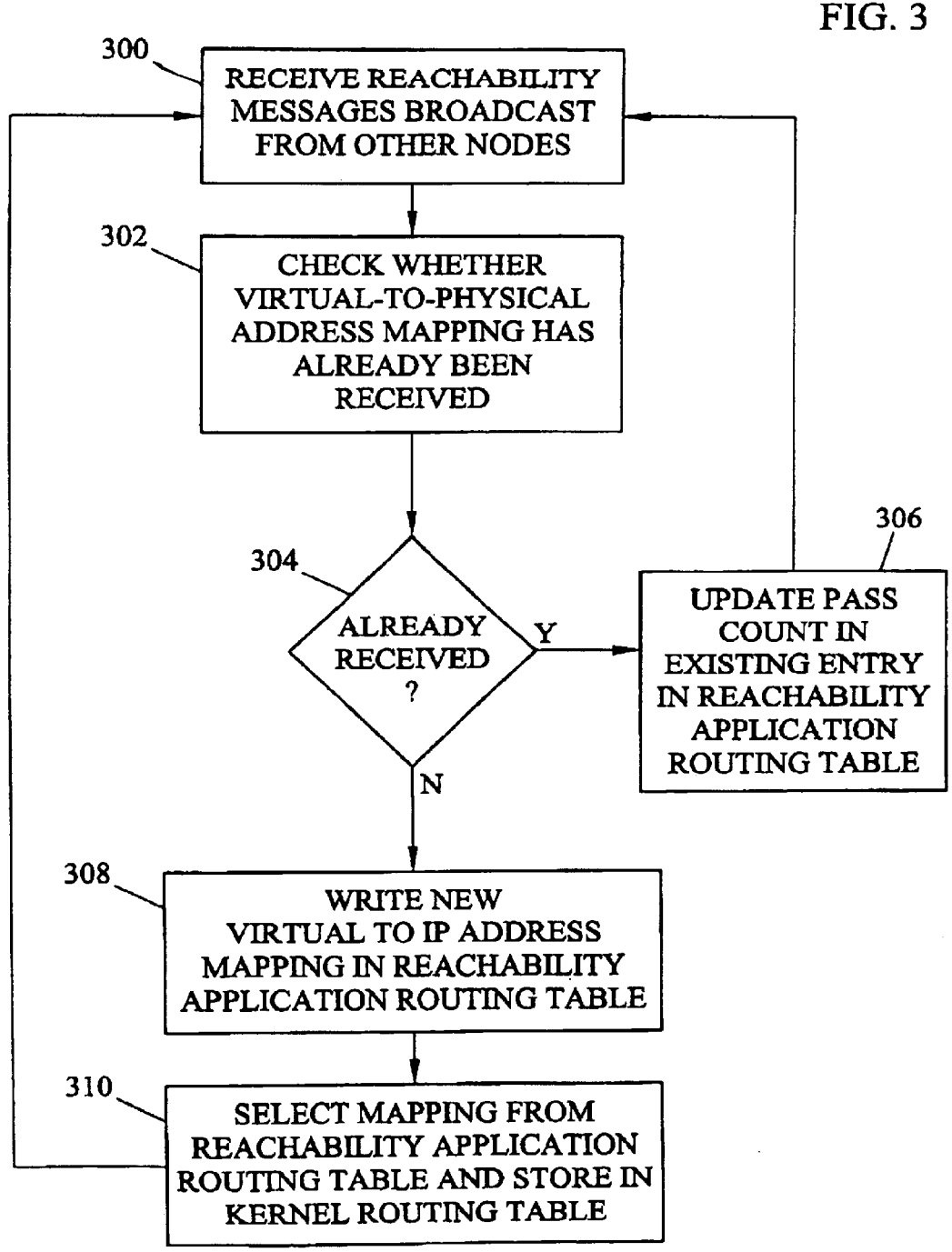
FIG. 3 is a flow chart illustrating exemplary steps that may be performed by a cluster node in updating reachability information in its routing tables according to an embodiment of the present invention.

FIG. 3 is a flow chart illustrating exemplary steps that may be performed by reachability applications 124 and 128 in updating reachability application routing tables 126 and 130 and for using information in reachability application routing tables 126 and 130 to update kernel routing tables 120 and 122. Referring to FIG. 3, in step 300, the reachability applications receive reachability messages broadcast from other nodes. For example, reachability applications 124 receive reachability message broadcasts from nodes 102A–102N. Similarly, reachability applications 128 receive reachability message broadcasts from nodes 100A–100N. In step 302, the reachability applications determine whether the virtual-to-physical IP address mapping in the particular reachability message has already been received. In step 304, if the mapping has already been received, control proceeds to step 306, where the reachability application simply updates the pass count in the existing entry in the reachability application routing table. Updating the pass count may include resetting the pass count to its original value. In the example illustrated in Table 4 above, the possible pass count values are 0, 1, and 2. 2 is the highest value of the pass count. Accordingly, updating the pass count in step 306 may include resetting the pass count to 2. Control then returns to step 300 to process the next reachability message.

In step 308, if the virtual-to-physical IP address mapping in the reachability message has not already been received, the reachability application writes the new virtual-to-physical IP address mapping in the reachability application routing table. The pass count for the entry is preferably set to 2.

In step 310, the reachability application selects one of the virtual-to-physical IP address mappings for each interface to store in the kernel routing table. The method for selecting which entry is written to the kernel routing table may vary between cluster nodes 100A–100N and cluster nodes 102A–102N because cluster nodes 100A–100N may only advertise a single virtual IP address, while cluster nodes 102A–102N may each advertise individual virtual IP addresses. Accordingly, for cluster nodes 100A–100N, reachability applications 124 may select the first mapping received for each interface on cluster nodes 102A–102N and store that mapping in kernel routing tables 120. Alternatively, reachability applications 124 may store the most recently received mapping for each interface on cluster nodes 102A–102N in kernel routing tables 120.

For cluster nodes 102A–102N, it is desirable to prevent all messages from being sent to the same physical interface on cluster nodes 100A–100N. Accordingly, a method for load balancing messages among cluster nodes 100A–100N is preferably provided. One exemplary embodiment of the invention, cluster nodes 102A–102N are assigned sequential virtual IP addresses. The sequential nature of the virtual IP addresses can be used to perform load balancing. One exemplary formula that may be used is as follows:

> Host byte of virtual IP address % num_routes_100A–100N=index to reachability application routing table In the formula above, the "%" symbol represents the modulus function, in accordance with standard programming languages, such as C and C++. The modulus function is used to select an index to the reachability application routing tables based on the host byte of the virtual IP address of cluster nodes 102A–102N. For example, if only one interface on one of cluster nodes 100A–100N broadcasts a reachability message, there will only be one route in reachability application routing tables 130. Thus, reachability applications 128 will each modulo the virtual IP addresses of their respective nodes with 1 (the number of routes to nodes 100A–100N). The result of the modulus operation will be 0, so each reachability application 128 will choose the 0 index to reachability application routing table 130, which causes all cluster nodes 102A–102N to select the same single advertised route. If another interface on cluster nodes 100A–100N begins broadcasting a reachability message, all of the even IP addressed cluster nodes 102A–102N will still use the same route, since their IP address modulo 2 (the number of routes broadcast by cluster nodes 100A–100N) will be 0. However, all of the odd numbered nodes 102A–102N will switch to the new route because their virtual IP addresses modulo 2 will result in an index of 1 to the reachability application routing table 130. If another route is broadcast by cluster nodes 100A–100N, one third of the cluster nodes 102A–102N will choose the new route. Thus, reachability applications 128 automatically rebalance routes among interfaces associated with a single virtual IP address. This automatic rebalancing may be useful when nodes are added or go out of service.

Figure 4:
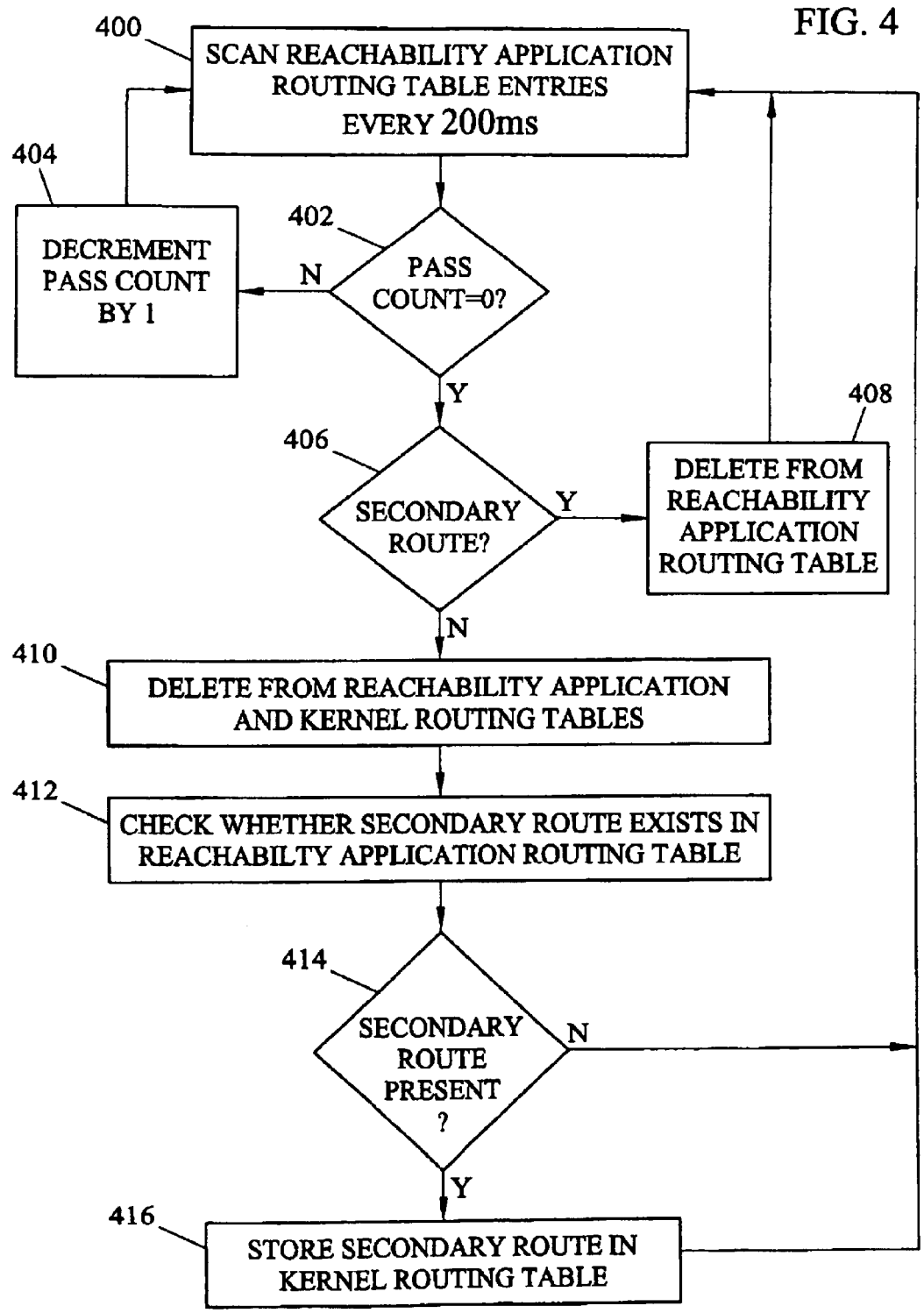
FIG. 4 is a flow chart illustrating exemplary steps that may be performed by a cluster node 100A–100N in FIG. 1 in deleting routes from its routing tables according to an embodiment of the present invention.

In order to dynamically switch to a new route when a route goes down, it is necessary to delete an old route from a kernel routing table and write the new route from the reachability application routing table to the kernel routing table. FIG. 4 illustrates exemplary steps that may be performed by reachability applications 124 on cluster nodes 100A–100N in deleting routes from reachability and kernel routing tables and switching to new routes. Referring to FIG. 4, in step 400, each reachability application 124 scans its reachability application routing table 126. In the illustrated example, each entry is scanned at an interval of 200 milliseconds. In step 402, it is determined whether the pass count is 0. In step 404, if the pass count is not 0, the pass count is decremented by 1. Control then returns to step 400 for the next entry.

If the pass count for a particular entry is 0 before reachability application 124 attempts to decrement the pass count, reachability application 124 checks whether the route is in use or whether the route is a secondary route. By "in use," it is meant that the route is present in the kernel routing table and being used to route messages. By "secondary route," it is meant that the route is a redundant route stored in the reachability application routing table but not in the kernel routing table. If the reachability application determines that the route is a secondary route, the route is simply deleted from the reachability application routing table and control returns to step 400 where the reachability application routing table is continuously scanned.

If, on the other hand, the reachability application determines that the route is in use, the reachability application deletes the route from the reachability application and kernel routing tables (410). Deleting the route from the kernel routing tables eliminates the route to a particular virtual IP address. Accordingly, in steps 412 and 414, the reachability application checks whether a secondary route exists in the reachability application routing table. If a secondary route is not present, then all routes to the particular destination IP address are unavailable and control returns to step 400 to wait for a new reachability message. If a secondary route is present, in step 414, the reachability application stores the secondary route in the kernel routing table.

Thus, using the steps illustrated in FIG. 4, a reachability application is able to quickly and transparently switch to a new route. Because the entries in the reachability application routing table are scanned every 200 milliseconds and the pass count is decremented from 2 to 1 to 0, the convergence time to detect an unusable route is no more than 600 milliseconds. This is a tremendous improvement over conventional routing protocols, such as RIP, where the convergence for a new route is 180 seconds or more.

Figure 5:
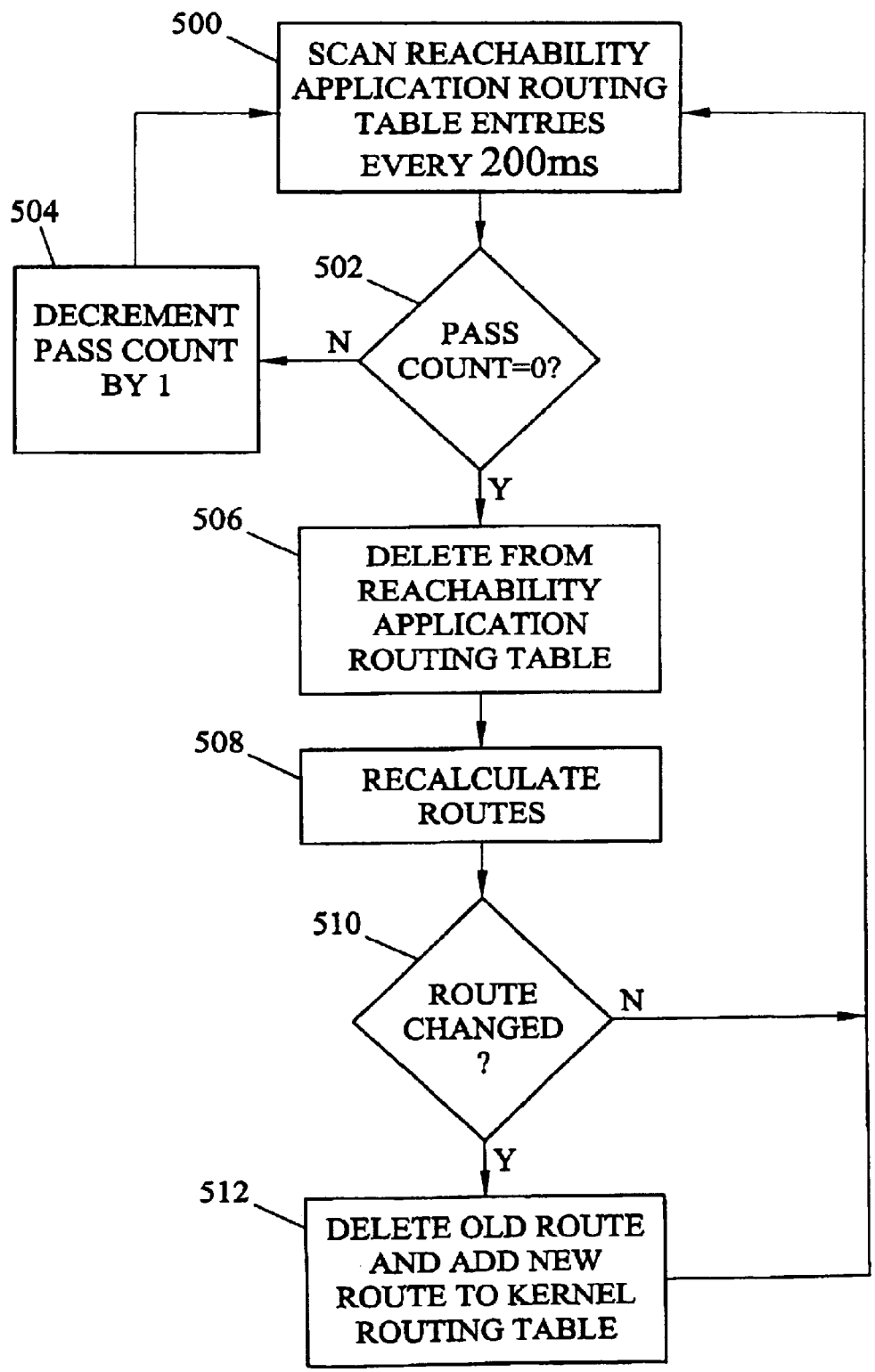
FIG. 5 is a flow chart illustrating exemplary steps that may be performed by a cluster node 102A–102N illustrated in FIG. 1 in deleting routes from its routing tables according to an embodiment of the present invention.

FIG. 5 illustrates exemplary steps that may be performed by reachability applications 128 on cluster nodes 102A–102N in deleting and rebalancing routes. The steps illustrated in FIG. 5 are similar to those in FIG. 4. However, because cluster nodes 100A–100N only advertise a single virtual IP address, some modification is required. Referring to FIG. 5, steps 500–506 are similar to those illustrated in FIG. 4. For example, the reachability applications scan the reachability application routing tables every 200 milliseconds, decrement the pass counts, and delete entries from the reachability applications routing tables when the pass count is 0 before the decrementing occurs. However, due to the dynamic rebalancing algorithm discussed above, loss of a route to one interface may or may not affect the routes in a particular kernel routing table. Accordingly, in step 508, the reachability applications recalculate routes using the rebalancing algorithm discussed above. In step 510, the reachability application on each node checks whether a route to the virtual IP address has changed. If the route has not changed, the entry in the kernel routing table remains the same and control proceeds to step 500 where the scanning continues. In step 512, if the route has changed, the reachability application deletes the old route from its kernel routing table and adds the new route to its kernel routing table. Thus, FIG. 5 illustrates exemplary steps for dynamically re-routing messages around failed links and for rebalancing message flow among remaining links. In addition, convergence time is reduced over conventional routing algorithms, such as RIP.

Thus, as described above, the present invention includes improved methods and systems for exchanging reachability information between cluster nodes and for switching traffic between redundant links in the event of a network failure. A virtual IP address is associated with multiple physical IP addresses to make switching between redundant interfaces seamless to applications. In addition, the convergence time of the methods and systems of the present invention is greatly reduced over that of conventional network routing protocols.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for exchanging reachability information in a network cluster, the method comprising:

(a) connecting first and second nodes in a cluster via local area network connections between local area network (LAN) interfaces of the first and second nodes;

(b) from each LAN interface of the second node, transmitting a reachability message associating a physical Internet protocol (IP) address of the LAN interface with a virtual IP address of the second node;

(c) at the first node, receiving the reachability messages and storing virtual-to-physical IP address mappings for each of the LAN interfaces associated with the second node in a first routing table;

(d) at the first node, selecting one of the virtual-to-physical IP address mappings for the second node from the first routing table and storing the selected mapping in a second routing table; and (e) repeating step (b) at predetermined time intervals, and, at the first node, in response to failing to receive a reachability message for a LAN interface of the second node within one or more of the predetermined time intervals, deleting the virtual-to-physical IP address mapping for the LAN interface from the first and second routing tables.

2. The method of claim 1 wherein connecting first and second nodes in a cluster via local area network connections includes connecting first and second nodes in a cluster via Ethernet connections.

3. The method of claim 1 wherein transmitting a reachability message associating a network address of each LAN interface of the second node with a virtual IP address of the second node includes transmitting a user datagram protocol (UDP) message from each LAN interface of the second node, the UDP message having a source address corresponding to the physical IP address of the transmitting LAN interface and a data portion carrying the virtual IP address of the second node.

4. The method of claim 1 wherein storing the virtual-to-physical IP address mappings for each of the LAN interface associated with the second node in a first routing table includes storing the virtual-to-physical IP address mappings in a reachability application routing table maintained by a reachability application, the reachability application routing table being used only to update the virtual-to-physical IP address mapping in the second routing table.

5. The method of claim 1 wherein selecting one of the virtual-to-physical IP address mappings for the second node from the first routing table and storing the selected mapping in the second routing table includes extracting a first-received virtual-to-physical IP address mapping from the first routing table and storing the first-received virtual-to-physical IP address mapping in the second routing table.

6. The method of claim 1 wherein extracting one of the virtual-to-physical IP address mappings for the second node from the first routing table and storing the selected mapping in the second routing table includes extracting a most recently received virtual-to-physical IP address mapping from the first routing table and storing the most recently received virtual-to-physical IP address mapping in the second routing table.

7. The method of claim 1 comprising, in response to deleting the virtual-to-physical IP address mapping for a LAN interface from the first and second routing tables, if an additional virtual-to-physical IP address mapping for the second node exists in the first routing table, storing the additional virtual-to-physical IP address mapping in the second routing table.

8. The method of claim 1 comprising:

(a) maintaining a pass count for each virtual-to-physical IP address mapping stored in the first routing table; and (b) altering the pass count for a virtual-to-physical IP address mapping in the first routing table in response to failing to receive a reachability message for the mapping within the predetermined time interval, and wherein deleting the virtual-to-physical IP address mapping for the LAN interface from the first and second routing tables includes deleting the mapping in response to the pass count reaching a predetermined value.

9. The method of claim 8 comprising resetting the pass count for each virtual-to-physical IP address mapping associated with a LAN interface of the second node in response to receiving a reachability message for the LAN interface.

10. The method of claim 1 comprising forwarding application-level messages from the first node to the second node using the virtual-to-physical IP address mapping stored in the second routing table.

11. The method of claim 1 comprising:

(a) from each LAN interface of the first node, transmitting a reachability message associating a physical IP address of each LAN interface of the first node with a virtual IP address of the first node;

(b) at the second node, receiving the reachability messages and storing virtual-to-physical IP address mappings for each of the LAN interfaces associated with the first node in a first routing table associated with the second node;

(c) at the second node, selecting one of the virtual-to-physical IP address mappings from the first routing table associated with the second node and storing the selected mapping in a second routing table associated with the second node; and (d) repeating step (a) at predetermined time intervals, and at the second node, in response to failing to receive a reachability message from a LAN interface of the first node within one or more of the predetermined time intervals, deleting the virtual-to-physical IP address mapping for the LAN interface from the first and second routing tables associated with the second node.

12. The method of claim 11 wherein the first routing table associated with the second node comprises a reachability application routing table used only to update the virtual-to-physical IP address mapping in the second routing table associated with the second node.

13. The method of claim 11 wherein selecting one of the virtual-to-physical IP address mappings for the first node from the first routing table associated with second node and storing the selected mapping in the second routing table associated with the second node includes selecting the virtual-to-physical IP address mapping based on the virtual IP address associated with the second node.

14. The method of claim 11 comprising:

(a) maintaining a pass count associated with each virtual-to-physical IP address mapping stored in the first routing table associated with the second node; and (b) altering the pass count associated with each virtual-to-physical IP address mapping in the first routing table associated with the second node in response to failing to receive a reachability message corresponding to the mapping within the predetermined time period, and wherein deleting the virtual-to-physical IP address mapping from the first and second routing tables associated with the second node includes deleting the virtual-to-physical IP address mapping in response to the pass count reaching a predetermined value.

15. The method of claim 11 comprising using the virtual-to-physical IP address mapping stored in the second routing table associated with the second node to forward messages to the first node.

16. The method of claim 1 wherein repeating step (b) at predetermined time intervals includes repeating step (b) at a time interval of 200 milliseconds.

17. A system for exchanging reachability information between redundantly connected nodes in a network cluster, the system comprising:
(a) a first network node having first and second network interfaces, the first network node being adapted to associate first and second physical Internet protocol (IP) addresses with the first and second network interfaces and a first virtual IP address with the first and second physical IP addresses;
(b) a second network node having third and fourth network interfaces connected to the first and second network interfaces of the first network node via a local area network (LAN) connection, the second network node being adapted to associate third and fourth physical IP address with the third and fourth network interfaces and a second virtual IP address with the third and fourth physical IP address;
(c) a reachability application associated with the second network node for periodically transmitting reachability messages from the third and fourth network interfaces to the first network node, the reachability messages for each network interface advertising a virtual-to-physical IP address mapping for the third and fourth network interfaces; and
(d) a reachability application associated with the first network node for receiving the reachability messages from the second network node, storing the virtual-to-physical IP address mappings for each of the third and fourth network interfaces in a first routing table, selecting one of the mappings from the first routing table and storing the selected mapping in a second routing table used for routing outbound packets.

18. The system of claim 17 wherein the first, second, third, and fourth network interfaces comprise Ethernet interfaces.

19. The system of claim 17 wherein the reachability messages comprise UDP messages having a source address equal to one of the third and fourth physical IP addresses and a data portion carrying the virtual IP address of the second network node.

20. The system of claim 17 wherein the reachability application associated with the first network node is adapted to delete virtual-to-physical IP address mappings from the first and second routing tables in response to failing to receive a reachability message corresponding to the virtual-to-physical IP address mapping from the second network node within a predetermined time period.

21. The system of claim 20 wherein the reachability application associated with the first network node is adapted to maintain a pass count associated with each of the virtual-to-physical IP address mappings stored in the first routing table and to alter the pass count in response to failing to receive a reachability message corresponding to a virtual-to-physical IP address mapping within the predetermined time period, and wherein the reachability application associated with the first node is adapted to delete virtual-to-physical IP address mappings in response to the pass count being equal to a predetermined value.

22. The system of claim 20 wherein, in response to deleting one of the mappings from the first and second routing tables, the reachability application associated with the first node is adapted to extract a remaining virtual-to-physical IP address mapping from the first routing table and store the remaining mapping in the second routing table.

23. The system of claim 17 wherein the reachability application associated with the first node is adapted to use the first routing table only to update entries in the second routing table.

24. The system of claim 17 wherein the reachability application associated with the first node is adapted to select a first received mapping from the first routing table and to store the first-received mapping in the second routing table.

25. The system of claim 17 wherein the reachability application associated with the first node is adapted to store a most recently received mapping from the first routing table and to store the most recently received mapping in the second routing table.

26. The system of claim 17 wherein the reachability application associated with the first network node is adapted to transmit reachability messages from the first and second network interfaces to the second network node, the reachability messages from the first and second network interfaces each including a virtual-to-physical IP address mapping for the first and second network interfaces, and wherein the reachability application associated with the second network node is adapted to receive the reachability messages from the first network node, to store the virtual-to-physical IP address mappings for each of the first and second network interfaces in a first routing table associated with the second network node, and to select one of the mappings from the first routing table associated with the second network node and to store the selected mapping in a second routing table associated with the second network node.

27. The system of claim 26 wherein the reachability messages from the first network node comprise UDP messages, each UDP message having a source address being equal to one of the physical IP addresses of the first and second network interfaces and a data portion including the virtual IP address of the first network node.

28. The system of claim 26 wherein the reachability application associated with the second network node is adapted to delete virtual-to-physical IP address mappings from the first and second routing tables associated with the second network node in response to failing to receive reachability messages from the first network node within a predetermined time period.

29. The system of claim 28 wherein the reachability application associated with the second network node is adapted to maintain a pass count associated with each entry in the first routing table associated with the second network node and to alter the pass count in response to failing to receive a reachability message within a predetermined time period, and wherein the reachability application associated with the second network node is adapted to delete the virtual-to-physical IP address mappings in response to the pass count reaching a predetermined value.

30. The system of claim 29 wherein in response to deleting a virtual-to-physical IP address mapping from the first and second routing tables, the reachability application associated with the second network node is adapted to select a remaining virtual-to-physical IP address mapping from the first routing table associated with the second network node and to store the selected virtual-to-physical IP address mapping in the second routing table associated with the second network node.

31. The system of claim 26 wherein the reachability application associated with the second network node is adapted to use the first routing table associated with the second network node only to update the second routing table associated with the second network node.

32. The system of claim 26 wherein the reachability application associated with the second network node is adapted to select the virtual-to-physical IP address mapping to be stored in the second routing table associated with the first network node based on the IP address of the second network node.

33. A method for exchanging reachability information in a network cluster, the method comprising:
 (a) connecting first and second nodes in a cluster via local area network connections between local area network (LAN) interfaces of the first and second nodes;
 (b) from each LAN interface of the second node, transmitting a reachability message associating a physical Internet protocol (IP) address of the LAN interface with a virtual IP address of the second node;
 (c) at the first node, receiving the reachability messages and storing virtual-to-physical IP address mappings for each of the LAN interfaces associated with the second node in a first routing table;
 (d) at the first node, selecting one of the virtual-to-physical IP address mappings for the second node from the first routing table and storing the selected mapping in a second routing table;
 (e) repeating step (b) at predetermined time intervals, and, at the first node, in response to failing to receive a reachability message for a LAN interface of the second node within one or more of the predetermined time intervals, deleting the virtual-to-physical IP address mapping for the LAN interface from the first and second routing tables;
 (f) from each LAN interface of the first node, transmitting a reachability message associating a physical IP address of each LAN interface of the first node with a virtual IP address of the first node;
 (g) at the second node, receiving the reachability messages and storing virtual-to-physical IP address mappings for each of the LAN interfaces associated with the first node in a first routing table associated with the second node;
 (h) at the second node, selecting one of the virtual-to-physical IP address mappings from the first routing table associated with the second node and storing the selected mapping in a second routing table associated with the second node; and
 (i) repeating step (f) at predetermined time intervals, and at the second node, in response to failing to receive a reachability message from a LAN interface of the first node within one or more of the predetermined time intervals, deleting the virtual-to-physical IP address mapping for the LAN interface from the first and second routing tables associated with the second node,
wherein selecting one of the virtual-to-physical IP address mappings for the first node from the first routing table associated with second node and storing the selected mapping in the second routing table associated with the second node includes selecting the virtual-to-physical IP address mapping based on the virtual IP address associated with the second node, and
wherein selecting the virtual-to-physical IP address mapping based on the virtual IP address of the second node includes computing an index to the first routing table associated with the second node based on a modulus of a host byte of the virtual IP address associated with the second node and a number of available routes to the first node.

34. A method for exchanging reachability information in a network cluster, the method comprising:
 (a) connecting first and second nodes in a cluster via local area network connections between local area network (LAN) interfaces of the first and second nodes;
 (b) from each LAN interface of the second node, transmitting a reachability message associating a physical Internet protocol (IP) address of the LAN interface with a virtual IP address of the second node;
 (c) at the first node, receiving the reachability messages and storing virtual-to-physical IP address mappings for each of the LAN interfaces associated with the second node in a first routing table;
 (d) at the first node, selecting one of the virtual-to-physical IP address mappings for the second node from the first routing table and storing the selected mapping in a second routing table; and
 (e) repeating step (b) at predetermined time intervals, and, at the first node, in response to failing to receive a reachability message for a LAN interface of the second node within one or more of the predetermined time intervals, deleting the virtual-to-physical IP address mapping for the LAN interface from the first and second routing tables,
wherein the first node comprises a link interface module in a telecommunications signaling message routing node and wherein the second node comprises a network monitoring processor coupled to the signaling message routing node.

35. A system for exchanging reachability information between redundantly connected nodes in a network cluster, the system comprising:
 (a) a first network node having first and second network interfaces, the first network node being adapted to associate first and second physical Internet protocol (IP) addresses with the first and second network interfaces and a first virtual IP address with the first and second physical IP addresses;
 (b) a second network node having third and fourth network interfaces connected to the first and second network interfaces of the first network node via a local area network (LAN) connection, the second network node being adapted to associate third and fourth physical IP address with the third and fourth network interfaces and a second virtual IP address with
 (c) a reachability application associated with the second network node for periodically transmitting reachability messages from the third and fourth network interfaces to the first network node, the reachability messages for each network interface advertising a virtual-to-physical IP address mapping for the third and fourth network interfaces; and
 (d) a reachability application associated with the first network node for receiving the reachability messages from the second network node, storing the virtual-to-physical IP address mappings for each of the third and fourth network interfaces in a first routing table, selecting one of the mappings from the first routing table and storing the selected mapping in a second routing table used for routing outbound packets,
wherein the first network node comprises a link interface module in a telecommunications network signaling message routing node and the second node comprises a network monitoring processor coupled to the telecommunications network signaling message routing node.

36. A system for exchanging reachability information between redundantly connected nodes in a network cluster, the system comprising:

(a) a first network node having first and second network interfaces, the first network node being adapted to associate first and second physical Internet protocol (IP) addresses with the first and second network interfaces and a first virtual IP address with the first and second physical IP addresses;

(b) a second network node having third and fourth network interfaces connected to the first and second network interfaces of the first network node via a local area network (LAN) connection, the second network node being adapted to associate third and fourth physical IP address with the third and fourth network interfaces and a second virtual IP address with the third and fourth physical IP address;

(c) a reachability application associated with the second network node for periodically transmitting reachability messages from the third and fourth network interfaces to the first network node, the reachability messages for each network interface advertising a virtual-to-physical IP address mapping for the third and fourth network interfaces; and (d) a reachability application associated with the first network node for receiving the reachability messages from the second network node, storing the virtual-to-physical IP address mappings for each of the third and fourth network interfaces in a first routing table, selecting one of the mappings from the first routing table and storing the selected mapping in a second routing table used for routing outbound packets, wherein the reachability application associated with the first network node is adapted to transmit reachability messages from the first and second network interfaces to the second network node, the reachability messages from the first and second network interfaces each including a virtual-to-physical IP address mapping for the first and second network interfaces, and wherein the reachability application associated with the second network node is adapted to receive the reachability messages from the first network node, to store the virtual-to-physical IP address mappings for each of the first and second network interfaces in a first routing table associated with the second network node, and to select one of the mappings from the first routing table associated with the second network node and to store the selected mapping in a second routing table associated with the second network node, wherein the reachability application associated with the second network node is adapted to select the virtual-to-physical IP address mapping to be stored in the second routing table associated with the first network node based on the IP address of the second network node, and wherein the reachability application associated with the second network node is adapted to compute a modulus of the virtual IP address of the second network node and a number of routes to first network nodes to select the virtual-to-physical IP address mapping to be stored in the second routing table associated with the second network node.

* * * * *